United States Patent [19]
Shimizu

[11] 3,948,456
[45] Apr. 6, 1976

[54] FILM WINDING DEVICE FOR PHOTOGRAPHIC CAMERAS

[75] Inventor: Terushige Shimizu, Kawasaki, Japan

[73] Assignee: Nippon Kogaku K.K., Tokyo, Japan

[22] Filed: June 25, 1974

[21] Appl. No.: 483,047

[30] Foreign Application Priority Data
June 30, 1973 Japan .......................... 48-77627[U]

[52] U.S. Cl. .................................. 242/71.4; 74/801
[51] Int. Cl.² ............................................ G03B 1/04
[58] Field of Search .......... 242/71, 71.3, 71.4, 71.5; 354/212, 213, 214, 206; 74/801

[56] References Cited
UNITED STATES PATENTS

| | | | |
|---|---|---|---|
| 1,270,809 | 7/1918 | Freeman | 74/801 |
| 2,002,405 | 5/1935 | Lansing | 74/801 X |
| 2,675,189 | 4/1954 | Harter | 242/71.4 |
| 3,414,209 | 12/1968 | Kimura | 242/71.5 |
| 3,757,660 | 9/1973 | Kuramoto | 242/71.4 |

*Primary Examiner*—Stanley N. Gilreath
*Assistant Examiner*—John M. Jillions
*Attorney, Agent, or Firm*—Shapiro and Shapiro

[57] ABSTRACT

A film winding device for photographic cameras, wherein a planet gear is rotatably provided relative to a rotary driving member which is driven by a film winding shaft; the planet gear is made engageable with a fixed internal gear and a sun gear which rotates on the axis of the rotary driving member; a film winding mechanism is coupled at either one or both of the rotary driving member and the sun gear; a ratchet pawl and ratchet teeth which are mutually engageable are provided on the rotary driving member and the sun gear; and the ratio in the number of revolutions between the rotary driving member and the sun gear is made greater than 2.

10 Claims, 17 Drawing Figures

FILM WINDING DEVICE FOR PHOTOGRAPHIC CAMERAS

BACKGROUND OF THE INVENTION

1. Field of the Invention

This invention relates to a film winding device for photographic cameras, and, more particularly, it is concerned with the film winding device for photograhic cameras of an improved construction wherein a planetary gear mechanism is employed for a smooth winding operation in a limited camera space.

2. Description of the Prior Art

The conventional photographic camera, in which the film winding and/or the shutter charging are carried out by a single operation of a film winding lever, is so constructed that a preventive device against reverse rotations of a ratchet mechanism and so on is provided within a transmission mechanism of a rotational force derived by the film winding lever so that it may not return to the original position even when a hand is kept off the winding lever on the way of the film winding, or that the shutter charging mechanism in the film winding device is maintained in a state of being immediately prior to return of the winding lever to its original position, even if it returns thereto. However, where a space in the camera to accommodate the ratchet mechanism is restricted to a considerable degree, it becomes inevitably necessary to broaden the space interval between adjacent teeth of a ratchet wheel so as to secure exact engagement of a ratchet pawl with the ratchet teeth and to prevent the ratchet wheel from lowering its mechanical strength and durability due to narrowing of the space interval between the adjacent ratchet, because, in such restricted camera space, there is no possibility of increasing the diameter of the ratchet wheel. In this consequence, there arises such defect that the falling angle of the ratchet wheel becomes large.

SUMMARY OF THE INVENTION

With the above-described defect inherent in the conventional film winding device for the photographic camera in mind, it is an object of the present invention to provide an improved construction of the film winding device, in which a planet gear mechanism is employed.

It is another object of the present invention to provide the film winding device of an improved construction which comprises in combination: a film winding shaft; a rotary driving member driven by the film winding shaft; a film winding means interconnected with the rotational motion of the rotary driving member; a first ratchet means provided in the rotary driving member; a planet gear pivotally and rotatably supported on the rotary driving member; a fixed gear engaged with the planet gear; and a sun gear engaged with the planet gear in a rotatable manner relative to the rotary driving member with a ratio of a number of revolution being greater than 2 with respect to the rotary driving member; and a second ratchet means which, in cooperation with the first ratchet means, prevents the rotary driving member from rotating in the reverse direction.

The foregoing objects of the present invention, and the construction and functions of the improved mechanism which has been realized thereby will become more apparent and understandable from the following detailed description when read in conjunction with the accompanying drawing.

BRIEF DESCRIPTION OF THE DRAWINGS

FIG. 6 indicates a state wherein the film is being wound-up; and FIG. 7 indicates a state upon completion of the film winding;

DESCRIPTION OF THE PREFERRED EMBODIMENTS

Figure 1:
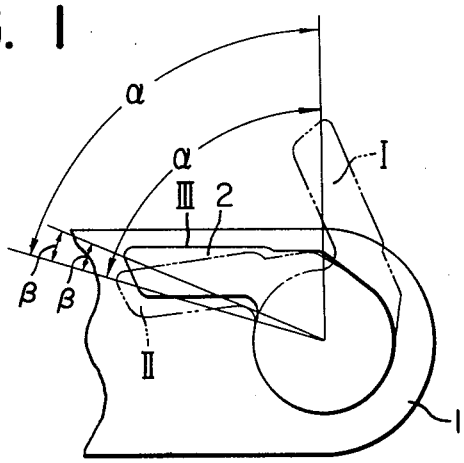
FIG. 1 is a diagram explaining the function of the film winding lever according to one embodiment of the present invention.

In the following, one embodiment of the present invention will be explained in reference to a photographic camera of a type, in which the film winding, the shutter releasing, and the shutter charging are performed by reciprocating motions of a single lever. Note that FIGS. 3 to 11 of the accompanying drawing are simplified to the extent that unnecessary parts for the purpose of explanations of the relevant mechanism are omitted to avoid any complication of the drawing.

Referring first to FIG. 1 which is to explain the function of the film winding lever according to the present invention, it is assumed that the shutter is in a charged state when the film winding lever 2 provided at one part of a camera body 1 is situated at a position I. This winding lever 2 is caused to rotate in the counterclockwise direction from the position I by an angle $\alpha$ to reach a position II, during which one film frame is wound. Thereafter, the lever 2 rotates in the clockwise direction by an angle $\beta$ and stops at a position III. Again, this lever 2 rotates in the counterclockwise direction by the angle $\beta$ from the position III and, in the course of its reaching the position II, the shutter is released, after which, while the lever 2 rotates in the clockwise direction from the position II by the angle $\alpha$ to arrive at the position I, the shutter is charged.

Based on the preceding explanations on the principle of the film winding, the shutter releasing, and the shutter charging operation, actual construction of the operating mechanism will be described in reference to FIGS. 2 to 17.

Figure 3:
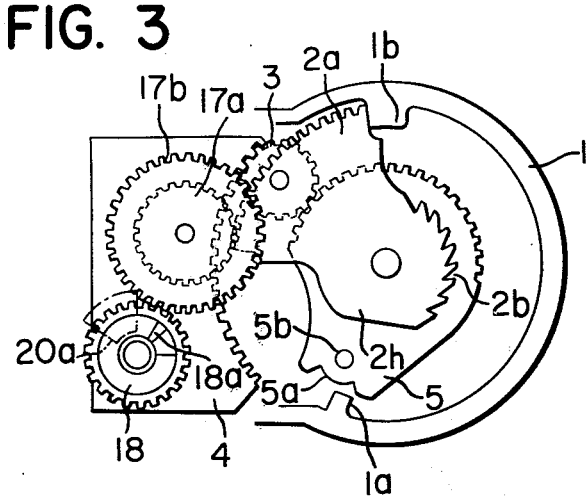
FIG. 3 is a plan view showing a driving mechanism for a sprocket according to the embodiment of the present invention.
Figure 2:
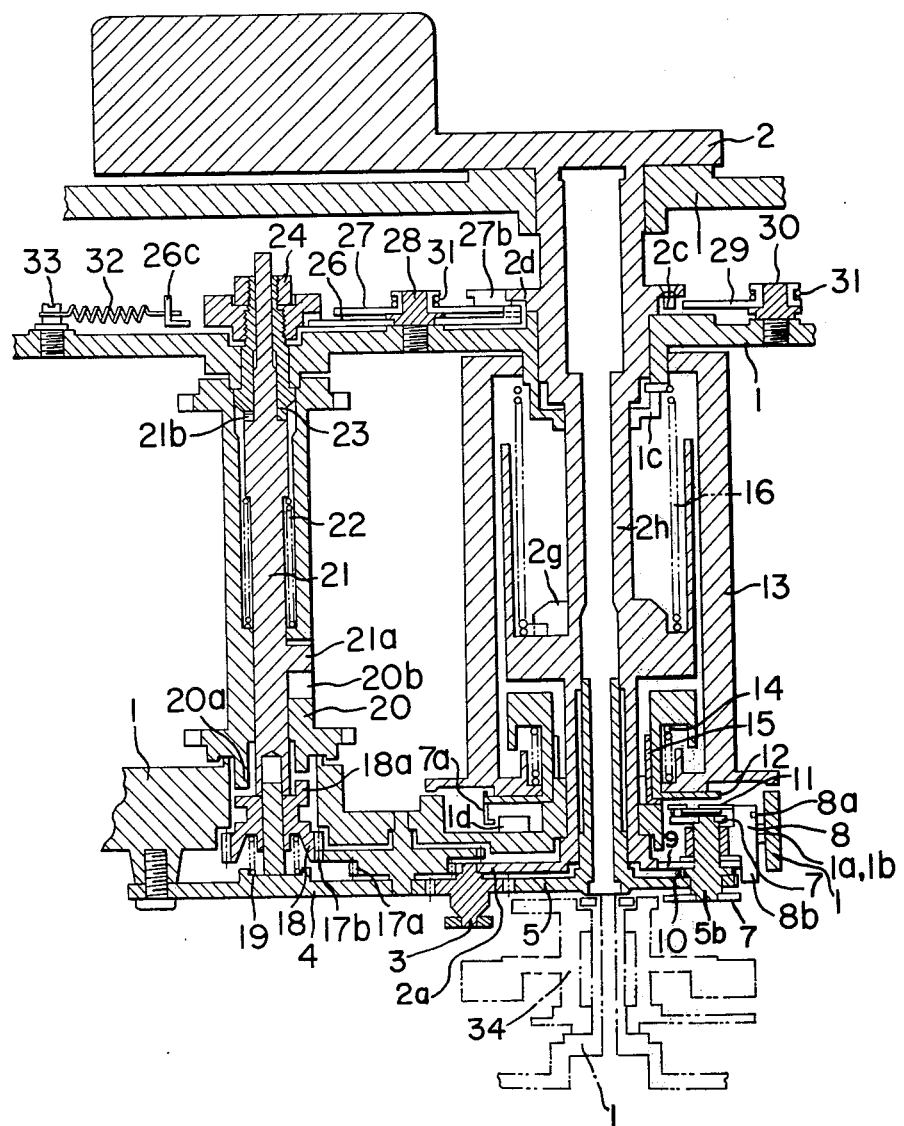
FIG. 2 is a longitudinal cross-section showing the main part of the embodiment of the film winding device according to the present invention.

Referring to FIG. 2 which shows a longitudinal cross-section of the film winding mechanism according to the present invention, the film winding lever 2 and a film winding shaft $2h$ integrally formed with the winding lever 2 are rotatably supported on a camera body 1. This winding shaft $2h$, as shown most clearly in FIG. 3, is provided at the bottom part thereof with a sector gear $2a$ and ratchet teeth $2b$ integrally formed with the shaft $2h$. On the top part of the film winding lever 2, there are provided an eccentric pin $2c$, ratchet teeth $2d$, a notched part $2e$, and a shallow recess $2f$, all being formed integrally with the winding shaft $2h$ on the peripheral part thereof, as is most clearly shown in FIG. 10. Further, at the center part of the film winding shaft $2h$, there is integrally formed a hook $2g$ for a spring.

As clearly shown in FIGS. 2 and 3, a planet gear 3 which is formed on one part of the sector gear $2a$ and is rotatable with the rotational winding shaft $2h$ is engaged with an integral gear 4 fixed on the camera body 1 and a sun gear 5 rotatably supported in the winding shaft $2h$. This sun gear 5 is provided in one part thereof with a sector type notch $5a$ and a fixed shaft or pin $5b$ in the vicinity of the notch $5a$.

Figure 4:
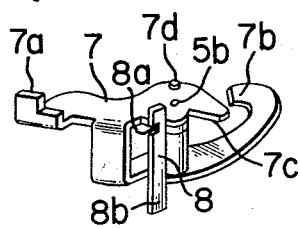
FIG. 4 is a perspective view of a spool actuating member according to the embodiment of the present invention.

A spool actuating lever 7 shown in FIG. 4 in perspective view is rotatably supported by the abovementioned fixed shaft $5b$ of the sun gear 5, and possesses a ratchet pawl $7a$ for the spool, a releasing pawl $7b$, a release control part $7c$, and a fixed pin $7d$. A change-over lever 8 is rotatably supported on the fixed pin $5b$ of the sun gear 5. One end part of a change-over lever 8 is provided with a small groove $8a$ for hooking a spring, and the other end thereof is engaged with the sector notch $5a$ of the sun gear 5 to undergo restriction in its rotation.

Figure 5:
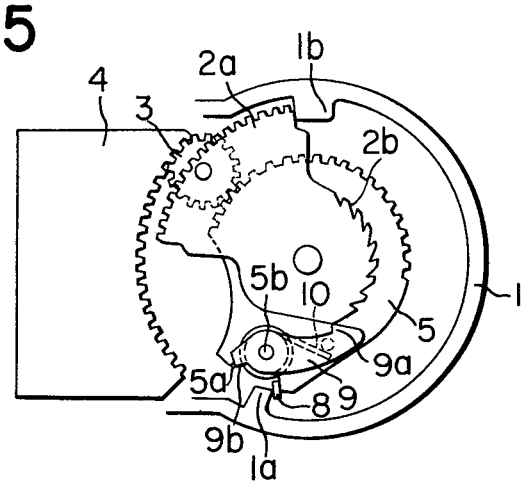
FIGS. 5, 6 and 7 are respectively plan views showing the preventive mechanism in the film winding device according to the embodiment of the present invention, in which FIG. 5 indicates a state of the reverse rotation prevention mechanism immediately before commencement of the film winding.
Figure 6:
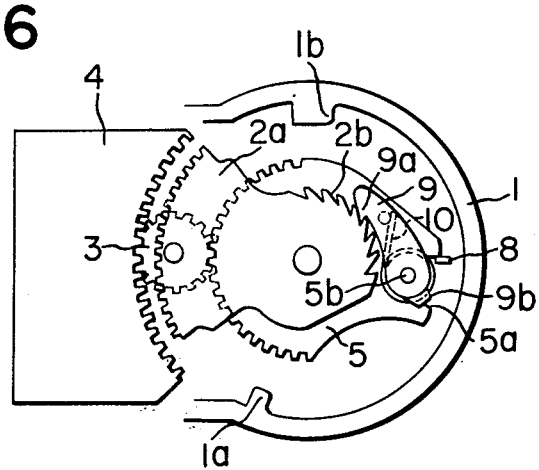
Figure 7:
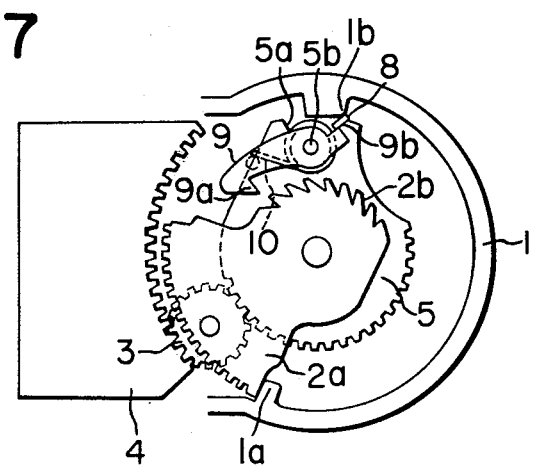

As most clearly shown in FIG. 5, a reverse rotation prevention pawl 9 is rotatably held by the fixed pin $5b$ of the sun gear 5. The reverse rotation prevention pawl 9 is energized by a spring 10 shown in FIG. 2 in the counterclockwise direction around the fixed pin $5b$ at each stage of: immediately before; during; and upon completion of the film winding as indicated in FIGS. 5, 6, and 7. Further, the pawl 9 possesses one end $9a$ to be engaged with the ratchet teeth $2b$ and the other end $9b$ to be in contact with the change-over lever 8. As explicitly indicated in FIG. 8, a change-over spring 11 is hooked at one end thereof on the groove $8a$ of the change-over lever 8, and is fitted at the other end thereof onto the pin $7d$ fixed on the spool actuating lever 7, the spring so energized that both ends are made close to each other.

Ratchet wheel 12 for the spool 13 as shown in FIG. 2 is rotatably held on the camera body 1. Between the ratchet wheel 12 and the film winding spool 13, there is provided a friction spring 14 to transmit rotation of the spool ratchet wheel 12 to the winding spool 13. The ratchet pawl $7a$ of the spool actuating lever 7 is energized in the clockwise direction in accordance with the lever 7 which is put into action in that direction around the fixed pin $5b$ by the spring 11, and, when the lever 7 is subjected to revolution in the counterclockwise direction around the winding shaft $2h$, the ratchet pawl $7a$ is engaged with teeth of the ratchet wheel 12 to cause it to rotate in that direction. As in FIG. 2, a friction plate spring 15 is disposed between the camera body 1 and the ratchet wheel 12 for the spool 13 to prevent the spool from its further rotation due to elasticity of the photographic film strip, when the ratchet pawl $7a$ of the spool actuating lever 7 disengages from the ratchet wheel 12.

A spring 16 for the film winding lever 2 is disposed in the camera body 1 surrounding the film winding shaft $2h$, and energizes the winding lever 2 in the direction opposite the film winding direction, i.e., in the clockwise direction as shown in the drawing except for FIG. 2.

As shown in FIG. 3, of two intermedite gears $17a$ and $17b$ which are integrally formed and rotatably supported on the pivot in the camera body 1, the gear $17a$ is engaged with the sector gear $2a$, and the other gear $17b$ is engaged with a sprocket wheel 18 rotatably supported on the pivot to the internal gear 4 fixed in the camera body 1. Accordingly, rotational force of the sector gear $2a$ is transmitted to this sprocket wheel 18 through the intermediate gears $17a$ and $17b$.

Again, referring to FIG. 2, a compression spring 19 is provided between the internal gear 4 and the sprocket wheel 18 to energize the latter in the upward direction.

In FIGS. 2 and 3, a small projection $18a$ upwardly formed on the sprocket wheel 18 is shown to be engageable with a projection $20a$ downwardly formed on a sprocket 20 confronting the sprocket wheel 18, when the former is rotating in the film winding direction, i.e., in the counterclockwise direction in FIG. 3, so as to transmit its rotational force to the sprocket 20. However, the engagement structure between the projections $18a$ and $20a$ of the sprocket wheels 18 and 20 is so designed by a well known expedient that no rotational force of the sprocket wheel 18 is transmitted to the sprocket 20 when the former rotates in the reverse direction.

The sprocket 20, as shown in FIG. 2, is supported on a sprocket shaft 21 which, in turn, is rotatably held on the pivot in the camera body 1, and is provided at one part thereof with a groove $20b$, with which a projection $21a$ formed at one part of the sprocket shaft 21 at a position corresponding to that of the groove $20b$ is engaged, whereby the rotational force of the sprocket 20 is transmitted to the sprocket shaft 21 through the engagement of the groove $20b$ and the projection $21a$.

Another projection, or, raised portion, $21b$ formed on the upper part of the sprocket shaft 21 is engaged with a rotatory coupling shaft 23 rotatably held on the camera body to transmit the rotational force of the sprocket shaft 21 to the rotatory coupling shaft 23. A spring 22 provided in the space between the sprocket 20 and the sprocket shaft 21 energizes the sprocket shaft in the upward direction so as to cause it to return to its original position at the time of rewinding the film, the sprocket shaft being usually pushed downward by a known expedient. On the top part of the rotatory coupling shaft 23, there is provided a cam 24 for limiting rotation of the sprocket 20, which is fixed to the shaft 23 by means of a screwing nut. The cam 24 as clearly shown in FIG. 12 possesses two notched parts $24a$ and $24b$ on the periphery thereof.

The gear ratios (not necessarily to be an integer) among the sector gear 2a, the intermediate gears 17a and 17b, and the sprocket 18 are so determined that the number of revolutions of the sprocket wheel 18 required to transfer one film frame may be greater that that of the counterpart sprocket 20 (in this embodiment, it is one revolution).

Figure 10:
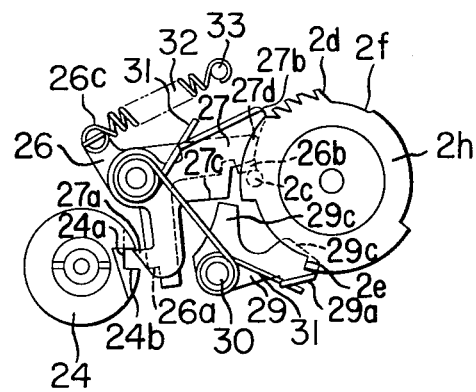
FIGS. 10 and 11 are respectively plan views showing a mechanism for stopping rotation of the sprocket in accordance with the embodiment of the present invention.
Figure 11:
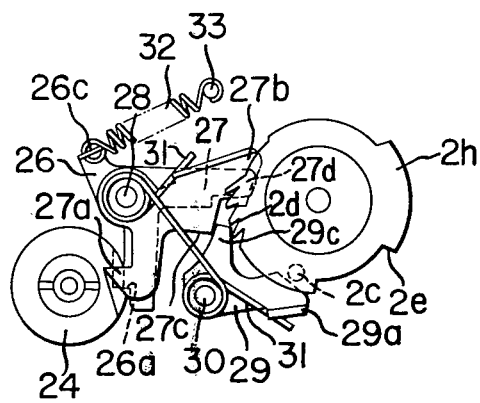

As shown in FIGS. 2, 10 and 11, on the upper part of the camera body 1 in the vicinity of the limiting cam 24, there is provided a fixed shaft 28 secured onto the camera body, and a lever 26 for limiting the sprocket rotation and another lever 27 for preventing incomplete shutter charging are rotatably supported on the fixed shaft 28. The limiting lever 26 is provided at one part thereof with a pawl, or more specifically a notch 26a to be engaged with the notched part 24b of the sprocket rotation limiting cam 24 to prevent the cam from its counterclockwise rotation; at another part thereof, with a riser part 26b to be engaged with the eccentric pin 2c on the winding shaft 2h; and, at other part thereof, with another riser part 26c. A tension spring 32 is secured at one end thereof to the above-mentioned riser part 26c, and, at the other end thereof, to a pin fixed on the camera body 1 so as to urge the limiting lever 26 in the clockwise direction. On the other hand, the incomplete shutter charging prevention lever 27 is provided at one part thereof with a pawl 27a to be engaged with the notched portion 24a of the sprocket rotation limiting cam 24 to prevent the cam from its clockwise direction; at another part thereof, with a pawl 27b to be engaged with the ratchet wheel 2d; at other part thereof, with an end part 27c to be engaged with a stopping part 29c of a shutter release lever 29; and, at still other part, with an engaging part 27d to be engaged with the riser part 26b of the limiting lever 26.

The sprocket rotation limiting cam 24 is so constructed that it accomplishes one revolution during the winding of one film frame, and that, upon completion of the film winding, the notched parts 24a and 24b come to their respective positions where they are engaged with the pawls 27a and 26a of the two levers 27 and 26, respectively.

The shutter release lever 29 rotatably supported on a shaft 30 fixed on the top part of the camera body 1 is provided with a ratchet pawl 29a to be engaged with the sector type notch 2e formed on the film winding shaft 2h, a projection 29b to be in contact with the eccentric pin 2c on the film winding shaft, and the above-mentioned stopping part 29c. A torsion spring 31 which is turned round the fixed shafts 28 and 30 in succession is to energize the incomplete shutter charging prevention lever 27 in the clockwise direction and the shutter release lever 29 in the counterclockwise direction.

Figure 13:
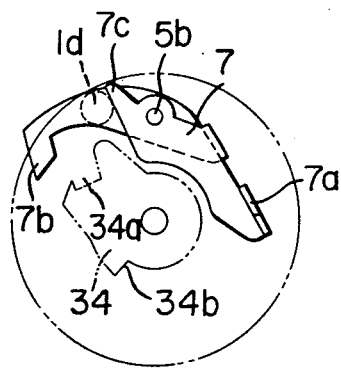
FIGS. 13 and 14 are respectively plan views showing a shutter releasing mechanism according to the embodiment of the present invention.
Figure 14:
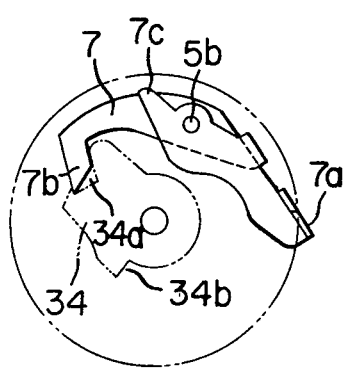

Referring now to FIGS. 2, 13 and 14, a shutter cam 34 is rotatably supported at the bottom of the camera body, and is so constructed that it may always be set at a predetermined position when the shutter is charged. This shutter cam 34 is provided with a notch, or a groove, 34a to be engageable with a shutter release pawl 7b of the spool actuating lever 7, and another notch, or a projection, 34b.

The film-winding, shutter-charging, and shutter-releasing device of the afore-described construction according to the present invention will operate in the following fashion, and the details of such operations are explained in sequence of the operational stages.

1. Film Winding a. Rotatory Operation of the Winding Spool

Figure 8:
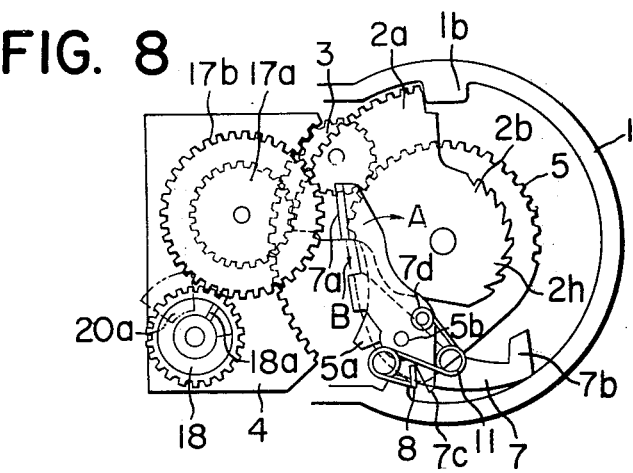
FIGS. 8 and 9 are respectively plan views showing a driving mechanism for a take-up spool in accordance with the embodiment of the present invention, in which FIG. 8 indicates a state immediately before taking-up of the film, and FIG. 9 indicates a state upon completion of the film winding.
Figure 9:
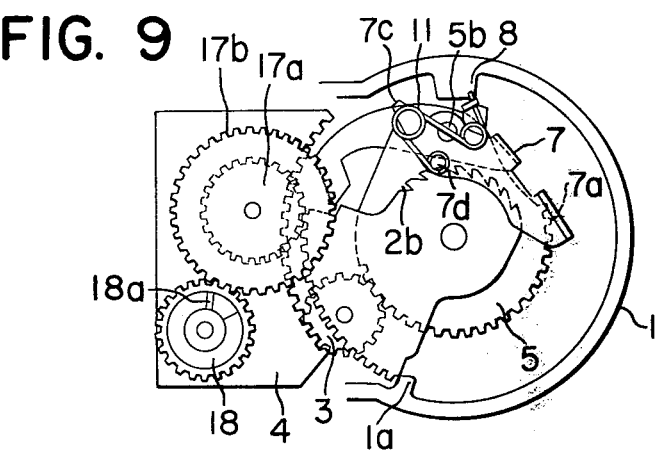
Figure 12:
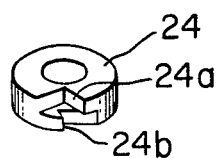
FIG. 12 is a perspective view showing a control cam to be used for the film winding device according to the present invention.

Referring to FIGS. 2, 8 and 9, when the film winding lever 2 is turned against the force of the spring 16 so as to cause the film winding shaft 2h to rotate in the counterclockwise direction, the planet gear 3 provided on the sector gear 2a, which rotates in the counterclockwise direction, revolves around the film winding shaft 2h in the counterclockwise direction, while it is rotating in the clockwise direction, because the planet gear 3 is engaged with the fixed internal gear 4. In this consequence, the sun gear 5 rotates counterclockwise with its number of revolutions being greater than that of the sector gear 2a.

On the other hand, since the spool actuating lever 7 which revolves in unity with the sun gear 5 is energized by the change-over spring 11 in the clockwise direction around the fixed pin 5b on the sun gear 5, the ratchet pawl 7a for the spool 13 rotates in the directions shown by an arrow B, while being energized in the arrow direction A, as shown in FIG. 8, with the consequence that the ratchet pawl 7a becomes engaged with the ratchet wheel 12 for the spool 13 to cause the spool to rotate in the counterclockwise direction.

Further, since the number of revolutions of the sun gear 5 is greater than the number of revolution of the sector gear 2a, the one end 9a of the reverse prevention pawl 9 which has been energized to engage with the ratchet teeth 2b by the force of the spring 10 with the engagement between the change-over lever 8 and a rotation limiting part 19 before the film winding commences (vide FIG. 5) becomes engaged therewith upon commencement of the film winding (vide FIG. 6) with the result that, even when the film winding lever 2 is liberated from the manual operation on its way of winding, there is no possibility of the winding lever 2 returning in the clockwise direction by the force of the spring 16. Upon further shifting of the lever 2, the film winding operation is complete (vide FIG. 7), when the change-over lever 8 supported on the fixed pin 5b contacts a rotation limiting part 1b inwardly projecting from the inner wall of the camera body 1, and is subjected to further and compulsory rotation in the clockwise direction with the fixed pin 5b as its center. As the consequence, the change-over lever 8 contacts the end part 9b of the reverse rotation prevention pawl 9 to cause the pawl to rotate in the clockwise direction with the fixed pin 5b as its center.

Thus, at the completion of the winding, the engagement between the reverse rotation prevention pawl 9 and the ratchet teeth 2b is released to bring the film winding shaft 2h to its state of rotation in the clockwise direction to return to its original position.

In connection with above-described operations of the gears, the ratchet teeth, and the ratchet pawl, explanations will be made hereinbelow with regard to decrease in the falling angle of the ratchet pawl when the planet gear mechanism according to the present invention is used as compared with a case wherein no planet gear mechanism is employed.

Figure 15:
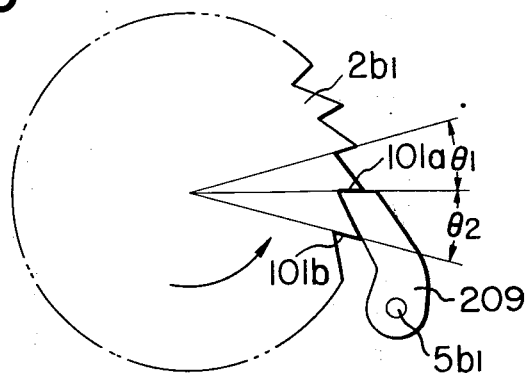
FIG. 15 is a plan view of the conventional ratchet mechanism.

FIG. 15 shows an engagement of a ratchet pawl 9a with one of ratchet teeth $2b_1$ in case no planetary gear mechanism is used, wherein the rotational shaft $5b_1$ of the ratchet pawl 209 is fixed. Now, assume that the pitch angle of a ratchet tooth is $\theta_1$. In order for the ratchet pawl 209 engaged with a face 101a of the tooth $2b_1$ to become engaged with a face $101b$ of the subsequent tooth by the counterclockwise rotation of the ratchet teeth $2b_1$, it is necessary that the ratchet teeth rotates for an angle $\theta_2$. In other words, the falling angle $\theta_2$ of the ratchet pawl 209 in this case is equal to $74_1$.

Figure 16:
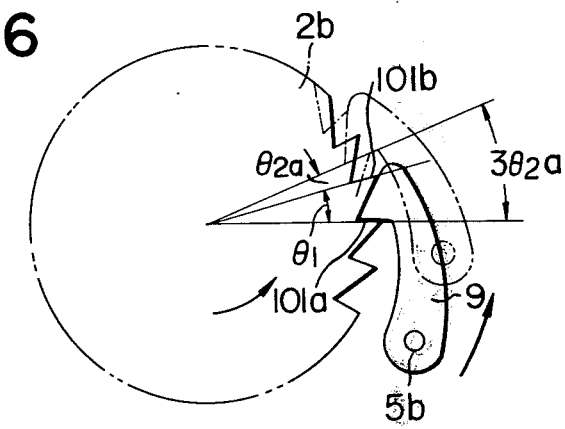
FIG. 16 is an explanatory diagram of the ratchet mechanism according to the present invention.

On the other hand, as shown in FIG. 16, when engagement between the ratchet teeth and the ratchet pawl is made in such a manner, according to the present invention, that the ratchet pawl 9 formed on the periphery of the sun gear is caused to rotate in counterclockwise direction same as that of the ratchet teeth $2b$ using the planet gear mechanism, and when the ratio in the number of revolutions between the ratchet pawl 9 and the ratchet teeth $2b$ is made greater than 2, the falling angle $\theta_2 a$ of the ratchet pawl 9 can be made small. In more detail, when the pitch angle of the ratchet wheel is taken as $\theta_1$ same as above, the ratio in the numbers of revolutions is taken as 3, for instance, and further, the rotational angle of any one of the ratchet teeth until the ratchet pawl 9 engaged with one face $101a$ of a ratchet tooth becomes engaged with another face $101b$ of the subsequent tooth is taken as $\theta_2 a$, the ratchet pawl 9 performs its rotation for an angle $3\theta_2 a$ during the period. In the drawing, the positions of the ratchet teeth $2b$ and the ratchet pawl 9 which performed their rotation for respective angles of $\theta_2 a$ and $3\theta_2 a$ are indicated by double dotted lines.

As will be evident from the drawing, the following equation is established between $\theta_1$ and $\theta_2 a$:

$$3\theta_2 a = \theta_1 + \theta_2 a$$

Solution to the above equation is as follows:

$$\theta_2 a = \theta_1/2$$

Accordingly, the falling angle $\theta_2 a$ of the ratchet pawl has reduced to one half of the case wherein the ratchet pawl is fixed. Needless to say, it is possible to further reduce the falling angle by setting the ratio in the numbers of revolution between the ratchet pawl and the ratchet teeth to be much greater.

On the other hand, as shown in FIGS. 2 and 9, when the change-over lever 8 rotates clockwise due to its contact with the rotation limiting member $1b$ upon completion of the film winding operation as described above, one end of the change-over spring 11 hooked on a spring hooking groove $8a$ of the change-over lever 8 is also moved compulsorily therealong in the clockwise direction. On account of this, the spool actuating lever 7, which has been so energized as to rotate in the clockwise direction during the film winding operation, becomes energized on the pivot of the fixed pin $5b$ in the counterclockwise direction upon passing through its dead point with the fixed pin $5b$ as the center thereof.

b. Sprocket Rotation Due to the Winding Operation

Referring now to FIGS. 2, 3, 8, and 9, the rotation of the sprocket due to the film winding operation will be explained in the following.

The counterclockwise rotation of the sector gear $2a$ by the abovementioned winding operation is transmitted to the sprocket wheel 18 by way of the intermediate gears $17a$ and $17b$, whereby the sprocket wheel 18 also rotates counterclockwise. Since the gear ratio between the sprocket 20 and the sprocket wheel 18 is so set that the former rotates by 360° for the one film frame winding, while the latter rotates larger than 360° e.g. 380°, the upward projection $18a$ of the sprocket wheel 18, at its initial stage of the film winding, is kept apart from the projection $20a$ of the sprocket 20 by a difference in the rotational angles between the sprocket wheel 18 and the sprocket 20 (in the abovementioned example, it is 380° − 360° = 20°) as shown in FIG. 3.

Accordingly, the sprocket wheel 18 rotates in the counterclockwise direction by the abovementioned differential angle due to the winding operation by the film winding lever 2, whereupon the projection $18a$ of the sprocket wheel 18 is engaged with the projection $20a$ of the sprocket 20. Further rotation of the sprocket wheel 18 thus causes the sprocket 20 to rotate in the counterclockwise direction, i.e., in the film winding direction.

c. Stopping Operation of the Rotating Sprocket at the Completion of the Film Winding Referring to FIGS. 1, 10 and 11, in particular, the functions of the sprocket rotation and stoppage at the completion of the film winding will be described hereinbelow.

With rotation of the sprocket 20, the sprocket shaft 21 also rotates on account of the engagement between the groove $20b$ of the sprocket 20 and the projection $21a$ of the sprocket shaft 21 as shown in FIG. 2. Simultaneously, the rotatory coupling shaft 23 engaged with another projection $21b$ of the sprocket shaft 21 is also rotated in accordance with rotation of the sprocket shaft 21, whereby the sprocket rotation limiting cam 24 secured on the top part of the rotatory coupling shaft 23 also rotates in the counterclockwise direction as may be understood from FIG. 10 which indicates a state of each component member immediately before the film winding.

On the other hand, the pawl $27b$ of the incomplete shutter charging prevention lever 27 is out of the rotational orbit of the ratchet teeth $2d$ in spite of the energizing force of the spring 31 in the clockwise direction, because the end part $27c$ is engaged with the stopper $29c$ of the shutter release lever 29. On account of this structure, the film winding shaft $2h$ possibly rotates in the counterclockwise direction. The other pawl $27a$ of the incomplete shutter charging prevention lever 27 is engaged with the notched part $24a$ of the sprocket rotation limiting cam 24. The pawl, or more specifically, notch $26a$ of the sprocket rotation limiting lever 26 to prevent the sprocket rotation limiting cam 24 from its counterclockwise rotation, i.e., rotation in the film winding direction, by the engagement of the pawl 26 and the notched part $24b$ of the sprocket rotation limiting cam 24 is released from the engagement with the notched part $24b$ by the engagement between the riser part $26b$ and the eccentric pin $2c$ provided on the film winding shaft $2h$. As the result, the sprocket relation limiting cam 24 freely rotates in the film winding, or counterclockwise, direction.

When the film winding shaft $2h$ rotates counterclockwise by the film winding operation of the winding lever 2, the engagement between the riser part $26b$ of the sprocket rotation limiting lever 26 and the eccentric pin $2c$ is released, and the lever 26 tends to rotate in the clockwise direction. However, as already mentioned in the preceding, since the sprocket rotation limiting cam 24 has already rotated in the counterclockwise direction at that time by the film winding operation, the pawl $26a$ does not fall into the notched part $24b$, but contacts the outer peripheral part of the cam 24, whereby the lever 26 is restrained from its further rotation.

Upon the counterclockwise rotation of the winding shaft 2h, the ratchet pawl 29a of the shutter release lever 29 is immediately engaged with the sector type notch 2e formed on the film winding shaft 2h, on account of which no reversing motion of the film winding lever 2 becomes possible thereafter. This engagement between the ratchet pawl 29a and the sector notch 2e takes place in advance of the engagement between the reverse rotation prevention pawl 9 and the ratchet teeth 2b as already explained in reference to FIG. 6. Accordingly, even when the ratchet pawl 29a is disengaged from the notch 2e by the rotation of the film winding shaft 2h thereafter, the reverse rotation of the film winding lever 2 in the clockwise direction is also impossible on the way of the film winding operation, because the reverse rotation prevention pawl 9 is then engaged with the ratchet teeth as explained in reference to FIG. 6.

When the film winding shaft 2h further rotates in the counterclockwise direction by the operation of the film winding lever 2, and the eccentric pin 2c provided on the shaft 2c contacts the projection 29b of the shutter release lever 29, the lever 29 is caused to rotate in the clockwise direction against the energizing force of the spring 31. Then, the stopping part 29c of the shutter release lever 29 disengages from the end part 27c of the incomplete shutter charging prevention lever 27 with the consequence that the lever 27 becomes rotatable in the clockwise direction by the force of the spring 31. Thereafter, when the notched part 24a of the sprocket rotation limiting cam 24 comes to a position confronting the pawls 26a and 27a of the sprocket rotation limiting lever 26 and the incomplete shutter charging prevention lever 27, respectively, the pawls 26a and 27a fall into the notches 24a and 24b of the sprocket rotation prevention cam 24, respectively, by the energizing force of the respective springs 32 and 31 to accomplish the film winding. At this time, the pawl 27b is engaged with the ratchet teeth 2d formed on the outer peripheral part of the film winding shaft 2h so as to prevent the shaft 2h from its counterclockwise rotation thereafter. After this engagement, the pawl 27a is engaged with the notch 24a, and the pawl 26a with the notch 24b, whereby rotations of the sprocket 20 in both clockwise and counterclockwise directions become impossible.

It goes without saying that the rotation of the film winding spool, the rotation of the sprocket, and the restrained rotation of the sprocket by the operation of the film winding lever 2 are all carried out in parallel until the film winding operation becomes complete, when the film winding lever 2 is at the position II in FIG. 1.

On the other hand, the reverse rotation prevention pawl 9 is disengaged from the ratchet teeth 2b as mentioned in the foregoing (vide FIG. 7), and the film winding lever 2 tends to go back in the clockwise direction by the spring 16 for the film winding lever 2. However, as explained in the foregoing with reference to FIG. 9, as the spool actuating lever 7 is energized in the counterclockwise direction around the fixed pin 5b on the sun gear 5 by means of the change-over spring 11, the spool actuating lever 7 rotates in the counterclockwise direction on the axis of the fixed pin 5b by the force of the spring 11, while it is revolving around the film winding shaft 2h in the clockwise direction as shown in FIG. 13 which indicates the positional relationship between the spool actuating lever 7 and the shutter cam 34 upon completion of the film winding. In this consequence, the releasing pawl 7b falls into the groove 34a of the shutter cam 34 (vide FIG. 14) to prevent the spool actuating lever 7 from its revolution and rotation, whereby the film winding lever 2 also stops its return motion. At this return motion of the film winding lever 2, the small upward projection 18a of the sprocket wheel 18 also returns slightly toward the clockwise direction and stops. In addition, the clockwise rotation of the spool actuating lever 7 causes disengagement of the ratchet pawl 7a from the ratchet wheel 12, when the film winding lever 2 is at the position III in FIG. 1.

2. Shutter Releasing Operation

In FIG. 14 which shows the positional relationship between the shutter cam 34 and the spool actuating lever 7 while the film winding lever 2 is at the position III in FIG. 1, when the lever 2 which has stopped by the engagement of the releasing pawl 7b and the groove 34a is caused to rotate again in the counterclockwie direction, the spool actuating lever 7 also commences revolution in the counterclockwise direction, and the shutter cam 34 also rotates in the counterclockwise direction by the engagement of the releasing pawl 7b and the groove 34a. And, when the release control part 7c of the spool actuating lever 7 hits the fixed pin 1d provided on the bottom part of the camera body 1, the spool actuating lever 7 performs the clockwise rotation on the axis of the fixed pin 5b on the sun gear 5, whereby the releasing pawl 7b disengages from the groove 34a. At this time, the shutter cam 34 rotates in the counterclockwise direction by an expedient (not shown) to release the shutter, and the notch 34b of this shutter cam 34 is engaged with a fixed pin (not shown) on the sun gear 5 for stoppage of the cam 34. The position of the film winding lever 2 in this case is at "II" in FIG. 1.

3. Shutter Charging Operations

After the shutter releasing, when the film winding lever 2 is made free from a photographer's hand, the lever 2 rotates in the clockwise direction together with the film winding shaft 2h by the force of the spring 16, since the groove 34a of the shutter cam 34 has already shifted in the counterclockwise direction at the time of the shutter releasing, and the spool actuating lever 7 is therefore free from engagement with any component member whatsoever. Accordingly, the sun gear 5 also rotates in the clockwise direction, and the shutter cam 34 also rotates clockwise by the engagement of the notch 34b of the shutter cam 34 with the fixed pin (not shown) on the above-mentioned sun gear 5, whereby the cam 34 returns to its position shown in FIG. 13 at the end of the shutter charging operation. By the clockwise rotation of the shutter cam 34, the shutter is charged through a known means (not shown).

On the other hand, in the course of the clockwise rotation of the film winding lever 2 for the shutter charging, no counterclockwise rotation of the film winding lever 2 can be performed on account of the ratchet pawl 27b of the incomplete shutter charging preventing lever 27 being engaged with the ratchet teeth 2d, so that the film winding lever 2 returns to the position I from the position II as shown in FIG. 1, and the shutter is always brought to its charged state before the film winding is carried out. In connection with this, the eccentric pin 2c reinstates from its position as shown in FIG. 11 to that as shown in FIG. 10 while the film winding lever 2 returns to its position I in FIG. 1 for charging the shutter. However, since the eccentric pin 2c pushes the riser part 26b of the sprocket rotation limiting lever 26 as shown in FIG. 10, the film winding lever 26 rotates in the counterclockwise direction, and, at the same time, the incomplete shutter charging prevention lever 27 also rotates in the counterclockwise direction by the engagement between the engaging part 27d of the lever 27 and the riser part 26b of the lever 26. As the result, the pawl 26a of the sprocket rotation limiting lever 26 separates from the notched part 24b of the sprocket rotation limiting cam 24, whereby the counterclockwise rotation of the cam 24 becomes possible. While, the end part 27c of the incomplete shutter charging prevention lever 27 becomes engaged with the stopping part 29c of the shutter release lever 29 to disengage the pawl 27b from the ratchet teeth 2d, whereby the film winding shaft 2h becomes rotatable in the winding direction. At this time, as the pawl 27a of the incomplete shutter charging prevention lever 27 has not yet been separated perfectly from the notched part 24a of the sprocket rotation limiting cam 24, the clockwise rotation of the sprocket 20 is not feasible, thereby preventing the film from becoming unexpectedly re-wound.

At the time of re-winding of the film, the sprocket shaft 21 is pushed downward by a known method as in FIG. 2 to disengage the projection 21b from the rotatory coupling shaft 23 and to simultaneously push down the sprocket wheel 18 against the force of the spring 19. By this operation, the engagement between the downward projection 20a of the sprocket 20 and the small upward projection 18a of the sprocket wheel 18 is released, and the sprocket 20 is thereby brought to its rotatable state, hence the re-winding of the film becomes possible.

Figure 17:
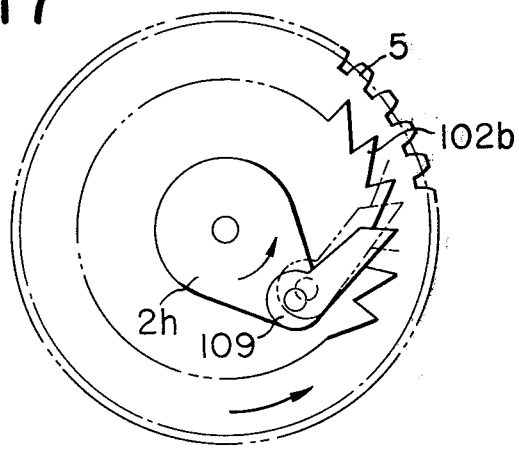
FIG. 17 is another embodiment of the ratchet mechanism according to the present invention.

In the above-described embodiment of the present invention, the ratchet pawl 9 is provided on the sun gear 5, and the racket teeth 2b are formed on one peripheral part of the film winding shaft 2h as the driving shaft. However, the present invention is not limited to this embodiment alone. That is to say, as schematically shown in FIG. 17, for example, the ratchet pawl 109 is provided on the film winding shaft 2h and the ratchet teeth 102b formed in one part of the sun gear 5 in the shape of an internal gear with the direction of the teeth being made opposite that of the ratchet teeth 2b in the afore-described embodiment, whereby the exactly same result as in the afore-described embodiment can be achieved.

According to the present invention as described in the foregoing, use of the planet gear in the film winding mechanism causes the falling angle of the ratchet pawl to be minimized even if a ratchet pawl is used which has a small diameter and a large pitch angle. In other words, a film winding mechanism with great strength can be obtained in which the falling angle is very small, or the winding operation of the film winding lever is remarkably smooth with no large space required in the camera body. The falling angle of the ratchet pawl can be freely selected by changing the number of revolutions of the driving shaft and the sun gear in the planet gear mechanism.

Although the present invention has been illustrates and fully described by way of preferred embodiments thereof, it is to be understood that such are merely illustrative and not restrictive, and that variations and modifications may be made therein without departing from the spirit and scope of the present invention as set forth in the appended claims.

I claim:

1. In an improved film winding device for photographic cameras of the type having:
   a film winding shaft;
   a rotary driving member driven by the film winding shaft; and
   a film winding means interconnected with the rotational motion of the rotary driving member, wherein the improvement comprises:
   a first ratchet means provided on said rotary driving member;
   a planet gear pivotally and rotatably supported on said rotary driving member;
   a fixed gear engaged with the planet gear;
   a sun gear engaged with said planet gear and rotatable relative to said rotary driving member with the ratio in the number of revolutions thereof being greater than 2 with respect to that of said rotary driving member; and
   a second ratchet means provided on the sun gear to prevent said rotary driving member from reverse rotation in cooperation with said first ratchet means.

2. The film winding device according to claim 1, wherein said first ratchet means are ratchet teeth, and said second ratchet means is a ratchet pawl engageable with said first ratchet means.

3. The film winding device according to claim 1, wherein said first ratchet means is a ratchet pawl, and said second ratchet means are ratchet teeth engageable with said first ratchet means.

4. The film winding device according to claim 2, wherein said first ratchet means is formed integrally with said rotary driving means.

5. The film winding device according to claim 1, further comprising a film take-up spool, and a lever for engaging the film take-up spool only upon film wind-up, the spool being rotatably mounted on said sun gear.

6. The film winding device according to claim 2, further comprising a spring to ensure the engagement between said first ratchet means and said second ratchet means.

7. In a film winding device for photographic cameras having a film winding shaft, a rotary driving member driven by the film winding shaft, and a film winding means, improvement which comprises: a first ratchet means provided on said rotary driving member; a planet gear pivotally and rotatably supported on said rotary driving member; a fixed gear engaged with said planet gear; a sun gear engaged with said planet gear and rotatable relative to said rotary driving member with the ratio in the number of revolution thereof being greater than 2 with respect to that of said rotary driving shaft; a second ratchet means provided on said sun gear to prevent said rotary driving member from reverse rotation in cooperation with said first ratchet means; a spring to ensure exact engagement between said first ratchet means and said second ratchet means; a film take-up spool; and a spool actuating actuating lever rotatably provided on said sun gear and having a ratchet pawl capable of transmitting the rotational force of said sun gear to said film take-up spool.

8. The film winding device according to claim 7, wherein said first ratchet means are ratchet teeth, and said second ratchet means is a ratchet pawl engageable with said first ratchet means.

9. The film winding device according to claim 7, wherein said first ratchet means is a ratchet pawl, and said second ratchet mean are ratchet teeth engageable with said first ratchet means.

10. The film winding device according to claim 8, wherein said first ratchet means is formed integrally with said rotary driving member.

* * * * *